UNITED STATES PATENT OFFICE.

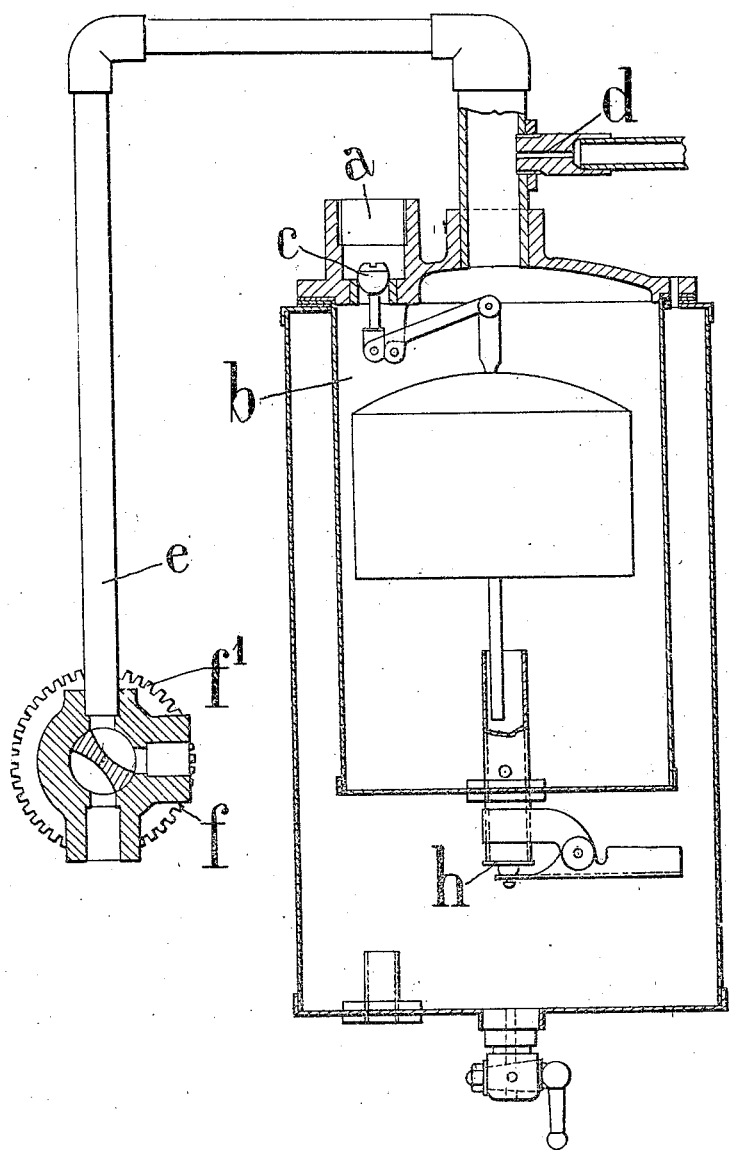

JOSEPH HIGGINSON AND HUBERT ARUNDEL, OF STOCKPORT, ENGLAND.

APPARATUS FOR RAISING LIQUIDS.

1,304,313.

Specification of Letters Patent.  Patented May 20, 1919.

Application filed February 4, 1919. Serial No. 274,972.

*To all whom it may concern:*

Be it known that we, JOSEPH HIGGINSON and HUBERT ARUNDEL, subjects of the King of Great Britain and Ireland, and residents of Sovereign Works, Stockport, in the county of Chester, England, have invented certain new and useful Improvements in Apparatus for Raising Liquids, of which the following is a specification.

This invention relates to apparatus for raising liquids and more particularly to suction operated devices for supplying fuel to internal combustion engines. With such devices, it is usual to employ an intermediate high level vessel into which the fuel is drawn by suction from the main fuel tank and from which it is discharged through a non-return valve by atmospheric pressure or a pressure greater than atmospheric.

The invention comprises the combination with the vessel into which liquid is drawn by suction and from which it is discharged by atmospheric pressure, or a pressure greater than atmospheric, and with a continuously open suction connection, of a positively mechanically operated pressure control valve for placing the said vessel intermittently under pressure by overcoming the effect of the suction action at regulated intervals.

The accompanying drawing shows a vertical sectional view of the intermediate high level vessel and its connections for placing the same in communication with discharging pressure.

In the apparatus as illustrated in the accompanying drawing, we provide the fuel inlet $a$ to the intermediate vessel $b$ with a float controlled valve $c$ so that such inlet is closed when the level of liquid in the vessel reaches a predetermined amount. The suction connection $d$ is adapted to be continuously open but the atmospheric or other pressure connection $e$ is controlled by a plug cock or timed valve $f$ positively operated through a mechanically rotated wheel as $f'$ or any suitable mechanism. Preferably, the suction connection is of small cross sectional area as shown and leads to the atmospheric or other pressure pipe or connection which is of relatively large bore.

With this arrangement, when the air valve $f$ is open, the amount of air which can pass the air valve is sufficient not only to neutralize the suction action in the air pipe $e$ but also to produce the desired pressure in the intermediate vessel $b$ for discharging its contents. The suction pipe $d$ exhausts the air from the air pipe and does not draw off carbureted or partly carbureted air such as would be the case if independent air and suction pipes extended to the intermediate vessel $b$, and the suction pipe was continuously open. We may, however, employ this latter arrangement, but we prefer the previously described arrangement or construction. The float controlled fuel inlet valve $c$ prevents flooding of the said vessel. The non-return valve $h$ controls the flow of liquid from the vessel $b$.

Having now described our invention what we claim as new and desire to secure by Letters Patent is:—

1. In apparatus for raising liquids, the combination with a vessel for the reception and distribution of the raised liquid of an inlet for the liquid, a valve for closing said inlet, a float for opening and closing said valve, an outlet for the liquid, a valve for closing said outlet, an inlet for admitting air to said vessel, a continuously open suction pipe connected to said air inlet, a valve for opening and closing said air inlet, and mechanical means, operating independent of said float, for intermittently actuating said air inlet valve.

2. In apparatus for raising liquids, the combination with a vessel for the reception and distribution of the raised liquid, of a continuously open suction connection, an inlet for the liquid, a valve for said inlet, a float for opening and closing the said valve, an outlet for the liquid, a non-return valve for the said outlet, an inlet for air, a valve for said air inlet, and mechanical means operating independent of said float, for intermittently actuating said air inlet valve.

In testimony whereof we have signed our names to this specification.

JOSEPH HIGGINSON.
HUBERT ARUNDEL.